May 10, 1938.  W. A. HARPER ET AL  2,116,674
ELECTRICAL DISTRIBUTION SYSTEM
Filed Jan. 14, 1935  2 Sheets-Sheet 1
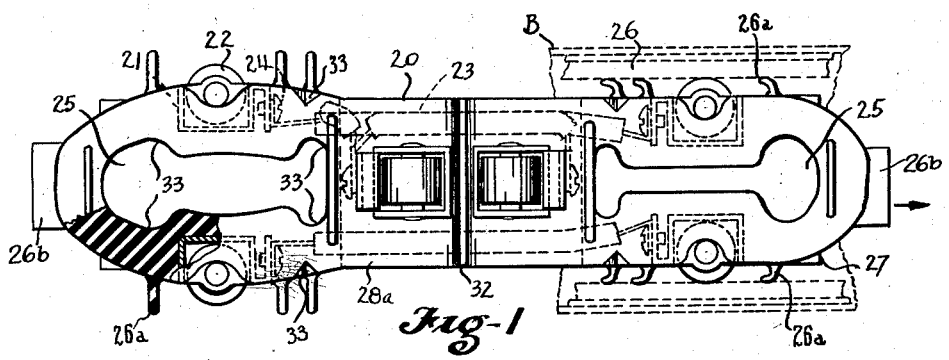
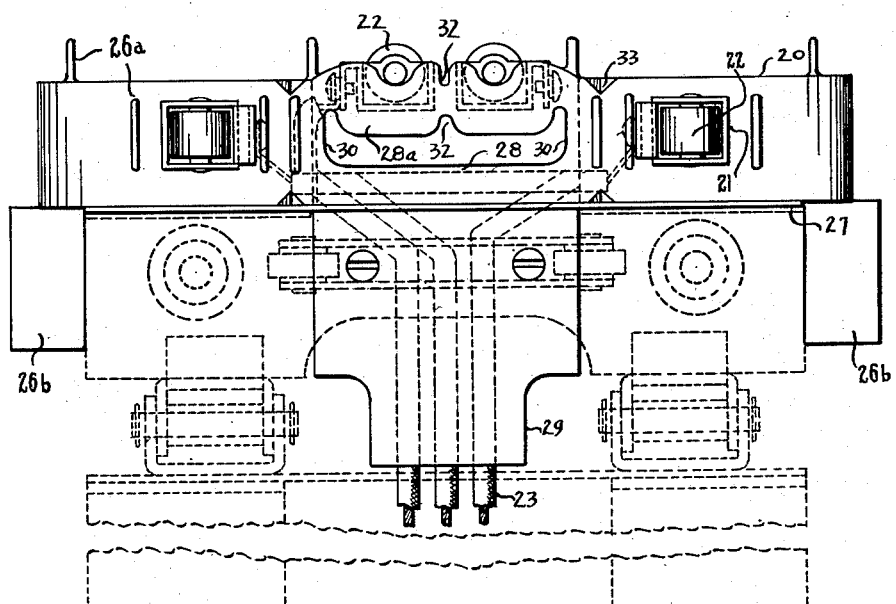
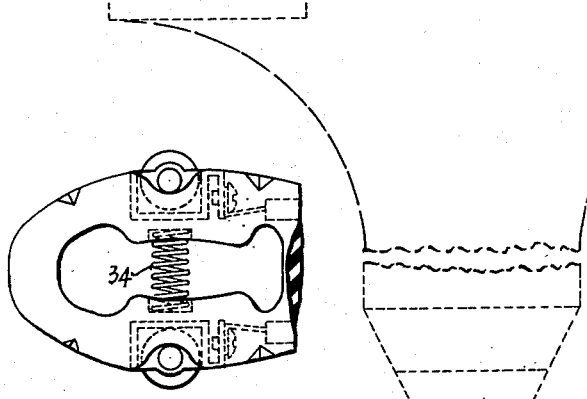
INVENTORS.
William A. Harper and
William P. Frank
BY
Daniel G. Cullen
ATTORNEY.

May 10, 1938.  W. A. HARPER ET AL  2,116,674
ELECTRICAL DISTRIBUTION SYSTEM
Filed Jan. 14, 1935   2 Sheets-Sheet 2
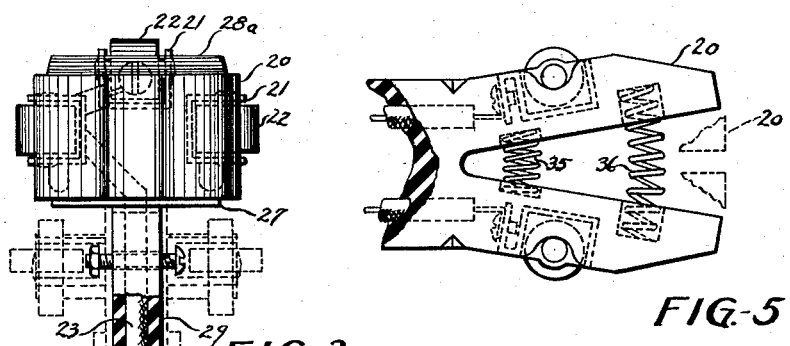
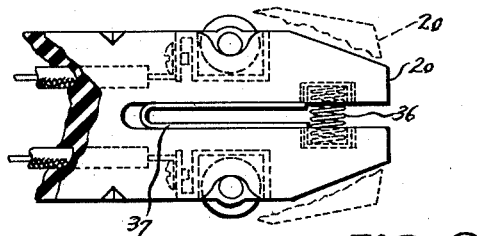
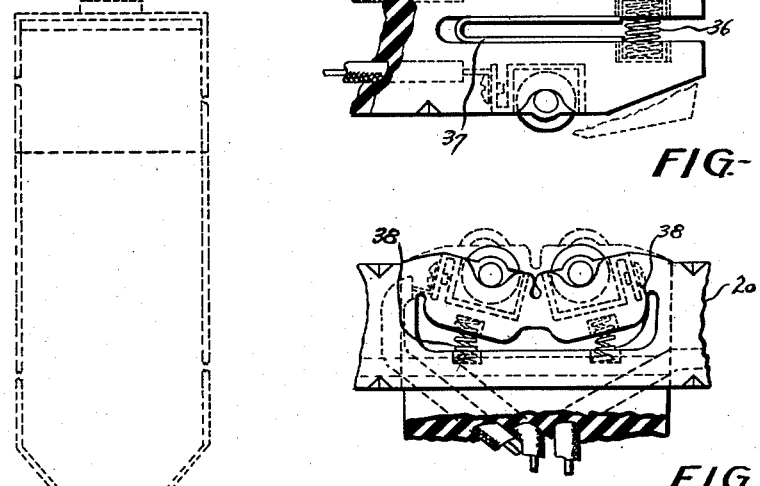
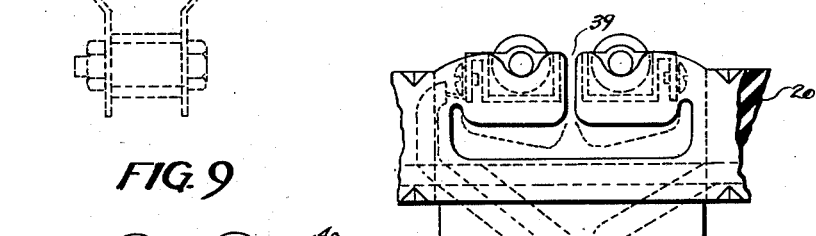
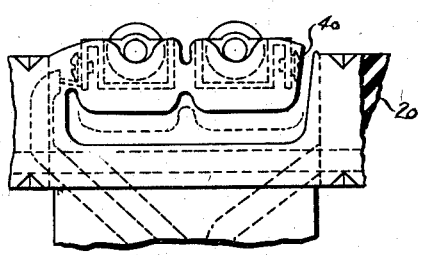
INVENTORS.
William A. Harper,
BY William H. Frank
Daniel J. Cullen
ATTORNEY.

Patented May 10, 1938

2,116,674

UNITED STATES PATENT OFFICE 2,116,674

ELECTRICAL DISTRIBUTION SYSTEM

William A. Harper and William H. Frank, Detroit, Mich.

Application January 14, 1935, Serial No. 1,660

6 Claims. (Cl. 191—48)

This application relates to improvements in trolleys or collectors intended for use with trolley ducts of electrical distribution systems.

Each collector disclosed includes a collector head made of a properly conformed block of molded material, such as rubber, the block having embedded therein contact rollers for engaging the bus bars of the trolley duct and also having imbedded therein branch circuit conductors electrically connected to the rollers.

The use of molded rubber for the head of a trolley or collector is of advantage for the reasons that the resilience of the rubber insures perfect alignment of collector contacts with bus bars by providing universal and multi-directional movement of the contacts, maintains adequate contact pressure on the collector contacts, obviates the necessity for using for the contacts, springs, hinges, additional connections, etc., minimizes the possibility of injury to contacts and the head itself by providing a resilient thrust and shock absorption means for the head and a resilient mounting for the collector parts, and also for the reasons that rubber is an insulating material and therefore adequately insulates the contacts and their conductors from one another, even if these conductors be bare rather than insulated by their own shrouds. Furthermore, thin fins may be molded integral with the rubber heads to provide bus bar wiping means, and these fins wipe the bus bars with very little friction.

The collectors disclosed are further characterized by the fact that the depending portions thereof which ride outside of the duct are formed to include a means for mounting fuses for branch circuit protection.

The collectors disclosed are also characterized by the fact that the depending portions thereof which ride outside of the duct are connected to the head portions which ride inside the duct through the medium of flexible joints, whereby loads or pulls on the depending portions, regardless of the direction from which these are exerted, will cause the trolleys to ride along the duct.

These and other characteristics of the constructions of this application may well be understood upon reference to the appended drawings, which disclose the collectors of this application. In these drawings—

Figs. 1–3 are plan, side, and end views of one form of collector, with parts being shown in phantom;

Figs. 4, 5 and 6 are partial plan views of modifications of the end sections of the head per se the collector of Figs. 1–3;

Figs. 7, 8 and 9 are partial side views of modifications of the center sections of the head per se of the collector of Figs. 1–3;

The collector shown in Figs. 1–9, intended to be an improvement over the one shown in application Serial No. 674,182, filed June 3, 1933, by Harrison J. L. Frank, William A. Harper, and Joseph A. Messing, comprises parts like those of the earlier disclosed collector and parts which are specific improvements over corresponding parts of the above referred to trolley. The novel parts of the collector head of this application are shown in full lines, and are formed for cooperation with the parts shown in phantom, it being clearly understood that the collector of Figs. 1–9 is in all respects, except for the specific construction of a part only, namely, the collector head per se, the same as the collector of the above referred to application.

The collector head per se of this application comprises a block 20 molded of resilient and pliant insulating material, such as rubber, in which are imbedded a plurality of metal cups 21 mounting contact and thrust rollers 22 on axles outside of the block and therefore readily accessible for renewal or repair of rollers; a plurality of relatively flexible, bare or insulated (as shown) branch circuit electrical conductors 23 are molded in the block and these are electrically connected to the cups and the contact rollers by soldering or through binding posts 24 and jumpers, as shown.

The block is so molded as to define end sections in the nature of loops around end apertures 25 and a center loop between them; each side edge of each end loop resiliently and floatingly mounts a contact and side thrust roller; the center section resiliently and floatingly mounts a pair of aligned contact and vertical thrust rollers.

The dimensions of the block 20 are such that when the collector head is inserted into a bus duct B, the loops are compressed and the bus bars 26 contained within the bus duct are tightly and firmly engaged for electrical contact by the rollers 22 imbedded in the block 20 as a result of the expanding reaction of the loops of the block 20; this insures adequate contact pressure between the contact rollers 22 and the side bus bars of the bus duct. The right end of the block of Fig. 1 is shown so compressed.

The block 20 is mounted upon a base plate 27 of stiff rigid insulation, and this base plate forms a dividing barrier between the contact rollers 21 above the plate, and the open bottom of the duct. The base plate is suitably secured to the carrier part of the trolley, as by means of screws or bolts, not shown, so that the block is carried by the carrier part of the trolley; the heads of the screws may be accessible through the end apertures 25.

The center loop of the block includes a base part 28 and a bridge 28a. Integral with the base part and depending from it is a stem 29 through which pass the molded-in branch circuit conductors 23, the stem itself projecting through an aperture of the base plate 27; the stem serves to insulate and protect the conductors from one another and from other parts of the collector.

The bridge 28a is supported on the abutments 30 which form parts of the loops and the bridge is traversed by grooves 32 between the rollers 22 of the bridge to facilitate flexing of the bridge as the trolley rides along the duct.

For cleaning the bus bars 26 of the bus duct, as the trolley rides along the duct, the block may be provided with integral flexible fins 26a which scrape and wipe the bus bars; and for eliminating shocks that may take place when carriers bump one another in the duct, the blocks may be provided with integral bumper lugs 26b.

It will be observed that the walls of the loops are notched as at 33 to facilitate flexing of the walls of these loops.

In the collector head of Figs. 1-3 the resilience of the material forming the loops and the shape of the loops is relied upon to maintain sufficient contact pressure between the contacts 22 and the bus bars of the trolley duct. In the event that this is not considered sufficient, auxiliary means may be employed to insure sufficient contact pressure between the rollers 22 and the bus bars, and such auxiliary means are clearly shown in Figs. 4-7. Fig. 4 shows the use of coiled compression springs 34 disposed in the apertures of the end loops between pairs of rollers. Fig. 5 shows the use of two coiled compression springs 35—36 for each end of the collector head; this figure in addition shows the expedient of splitting the end loops at the ends of the block so as to permit great expansion of the end loops due to the stress created by the springs therein. Fig. 6 shows a construction similar to that of Fig. 5, but wherein the innermost ones of the springs for the end loops are replaced by leaf springs 37 tending to bias the opposite walls of the loops outwardly. Fig. 7 shows coiled compression springs 38 disposed in the center loop space between the bridge and the base of the block.

In the event that it is found desirable to provide a greater degree or ease of flexing of the bridge, the bridge may be cut across by a split between the contacts, as in Fig. 8 at 39, or between one contact and the adjacent bridge abutment, as in Fig. 9 at 40 to enhance the flexibility of the bridge with respect to the remainder of the block.

While the various details and their modifications are shown in separate views, it will of course be understood that combinations of these details may well be effected in accordance with desired purposes. For example, the end construction of Fig. 4 may be utilized in a collector having the center construction of Fig. 7; other interchangeable permutations of the details shown in Figs. 1-9 may well be created in a manner that will readily be understood.

It will of course be understood that though no specific reference is given to the carrier portion of the collector head which is shown in phantom and which bears the side thrust rollers and the supporting rollers of the collector head that the phantom showing may well be considered as illustrating the corresponding parts shown in application Serial No. 674,182. Similarly, while the depending portion of the collector, which portion is intended for use as a load supporting portion, and which portion is intended to accommodate branch circuit protective means, such as fused switches, is shown only in phantom, it will be understood that the phantom showing is intended to illustrate the corresponding parts of the collector of application Serial No. 674,182. Similarly, while the pivotal connection between the collector head and the depending portion is not specifically described, it will be understood that the phantom showing thereof is intended to show the corresponding parts of the collector of application Serial No. 674,182.

We claim:

1. For use with a stationary track structure including a plurality of separated parallel stationary contact rails of different polarities, current collecting heads, each of which is in the form of a block of resilient pliant insulating material of the nature of rubber mounting separate and independent contacts arranged to ride along and engage the contact rails individually, conductors leading to a load remote from the stationary structure and having their terminals embedded within the block and mechanically and electrically connected individually to individual contacts, the material of the block insulating the individual contact-terminal-conductor and terminal to contact connection-sets from one another, and also permitting resiliently restrained movement of the contacts relatively, the blocks having portions thereof cut out to define loops on walls of which are mounted the contacts, the expanding tendencies of the loops serving to urge the contacts towards their contact rails and means adapted to support said current collecting head with respect to said contact rail permitting movement of the head, longitudinally of, and parallel to, said contact rails.

2. In combination, separated parallel stationary contact rails of different polarities, a current collecting head in the form of an elongated block of resilient pliant insulating material of the nature of rubber arranged with its long dimension parallel to the run of the rails and having a center portion and two end portions, each end portion mounting a contact arranged to ride along and engage a contact rail individually, conductors leading to a load remote from the rails and entering the center portion of the block from outside the block and having their terminals embedded within the block and mechanically and electrically connected individually to individual contacts, the material of the block insulating the individual contact-terminal-conductor and terminal-to contact connection-sets from each other, and also permitting resiliently restrained movement of the contacts relatively, and means adapted to support said current collecting head with respect to said contact rail permitting movement of the head, longitudinally of, and parallel to, said contact rails.

3. In combination, separated parallel stationary contact rails of different polarities, a current collecting head in the form of an elongated block of resilient pliant insulating material of the nature of rubber arranged with its long dimension parallel to the run of the rails and having a center portion and two end portions, each end portion mounting a contact arranged to ride along and engage a contact rail individually, conductors leading to a load remote from the rails and entering the center portion of the block from outside the block and having their terminals embedded within the block and mechanically and electrically connected individually to individual contacts, the material of the block insulating the individual contact-terminal-conductor and terminal-to contact connection-sets from each other, and also permitting resiliently restrained movement of the contacts relatively, each end portion being cut out to remove backing from the wall thereof on which is mounted the contact, whereby tendencies to move these walls away from the contact rails they engage are resisted by inherent tendencies of these walls due to the material thereof, and means adapted to support said current collecting head with respect to said contact rail permitting movement of the head, longitudinally of, and parallel to, said contact rails.

4. In combination, separated parallel stationary contact rails of different polarities, a current collecting head in the form of an elongated block of resilient pliant insulating material of the nature of rubber arranged with its long dimension parallel to the run of the rails and having a center portion and two end portions, each end portion having opposite walls on each of which is mounted a rail engaging contact, conductors leading to a load remote from the rails and entering the center portion of the block from outside the block and having their terminals embedded within the block and mechanically and electrically connected individually to individual contacts, the material of the block insulating the individual contact-terminal-conductor and terminal-to contact connection-sets from each other, and also permitting resiliently restrained movement of the contacts relatively, and means adapted to support said current collecting head with respect to said contact rail permitting movement of the head, longitudinally of, and parallel to, said contact rails.

5. In combination, separated parallel stationary contact rails of different polarities, a current collecting head in the form of an elongated block of resilient pliant insulating material of the nature of rubber arranged with its long dimension parallel to the run of the rails and having a center portion and two end portions, each end portion having opposite walls on each of which is mounted a rail engaging contact, conductors leading to a load remote from the rails and entering the center portion of the block from outside the block and having their terminals embedded within the block and mechanically and electrically connected individually to individual contacts, the material of the block insulating the individual contact-terminal-conductor and terminal-to contact connection-sets from each other, and also permitting resiliently restrained movement of the contacts relatively, each end portion being cut out to remove the backing from the walls thereof on which are mounted the contacts whereby tendencies to move the contacts and walls towards each other are resisted by the inherent tendencies of the walls due to the material thereof, and means adapted to support said current collecting head with respect to said contact rail permitting movement of the head, longitudinally of, and parallel to, said contact rails.

6. A trolley collector having a head including a base, abutment blocks projecting upwardly therefrom, and a plate bridging edges of said blocks and forming a support for a contact, the head, the blocks, and the plate all being integral and of flexible material.

WILLIAM A. HARPER.
WILLIAM H. FRANK.